Figure 1:
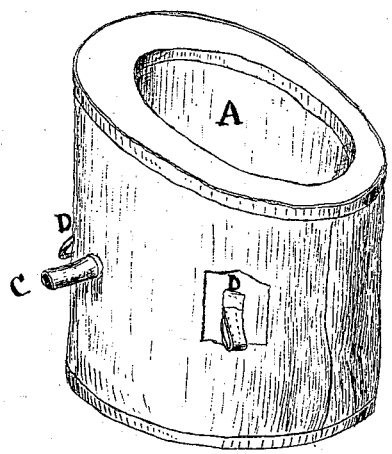
Figure 2:
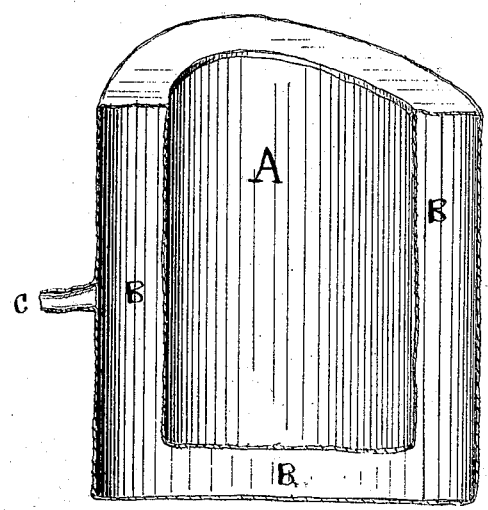

I. L. G. Rice.
Bandage.

No. 104,204.          Patented June 14, 1870.

Sectional View.

Witnesses: James T. Hays, Henry Smith.

Inventor: Israel L. G. Rice.

United States Patent Office.

ISRAEL L. G. RICE, OF CAMBRIDGE, MASSACHUSETTS.

Letters Patent No. 104,204, dated June 14, 1870; antedated June 2, 1870.

IMPROVED APPARATUS FOR CURE OF SPERMATORRHŒA.

The Schedule referred to in these Letters Patent and making part of the same.

I, ISRAEL L. G. RICE, of Cambridge, in the county of Middlesex and State of Massachusetts, have invented a certain Apparatus for the cure of Spermatorrhœa, of which the following is a specification.

The nature of my invention consists in providing a convenient receptacle for cold water in treating diseases of the penis and testicles.

To enable others to make and use my invention, I will proceed to describe its construction and operation.

I make a vessel of rubber or other suitable material, provided with double walls and bottom, shown at A, so that water may be put in between the sides, as shown at B, and provided with a tube, as shown at C, by means of which it may be filled.

On the outside of this vessel I put loops, shown at D.

The object of this apparatus is to prevent seminal losses by keeping the genital organs cool, which I accomplish as follows:

I fill the vessel with cold water by means of the tube C; I then fasten the mouth of the tube by tying it with a cord or by using a clamp. The penis or testicles, or testicles alone, are then placed in the interior of the vessel at A; it is then secured to the body by means of tapes attached to the loops D D; the other ends of the tapes are fastened to a belt passed around the body.

The water that is between the sides cools the organs, and thus prevents emissions.

In some difficult cases it may be found advantageous to connect the tube C with some other vessel containing cold water, which may run into B when the water in it becomes heated.

I claim as my invention—

A vessel made of hollow walls to contain water, B, with a receptacle for the penis and testicles, A, with an inlet-tube, C, and loops D, substantially as and for the purpose herein set forth.

ISRAEL L. G. RICE.

Witnesses:
 ST. CLAIR DENNY,
 L. T. HAYS.